Patented Feb. 27, 1951

2,543,548

UNITED STATES PATENT OFFICE 2,543,548

REFRACTORIES

Edward C. Henry, State College, and John L. Leech and Leland R. Armstrong, Washington, Pa., assignors to Findlay Clay Products Company, Washington, Pa., a corporation of Pennsylvania No Drawing. Application July 10, 1948, Serial No. 38,158

3 Claims. (Cl. 106—67)

This invention relates to refractory bodies high in silica and to the methods and formulae for producing them, and this application is a continuation in part of our application Serial No. 473,494, filed January 25, 1943, now abandoned.

One object of our invention is to produce refractories bodies that contain large percentages of silica and which are more slowly and uniformly soluble in molten glass than are refractories bodies of compositions heretofore employed.

Another object is to produce refractory bodies which will cause fewer stones and cords to be formed in glass with which the bodies have engagement.

Still another object of our invention is to produce refractory bodies that can be fired rapidly and with safety and which, after firing, have good resistance to thermal shock.

We have discovered that the mineral pyrophyllite when calcined has a silica content of about 70%, yet is particularly resistant to thermal shock. It is understood that when raw pyrophyllite, which has an approximate molecular composition of $Al_2O_3.4SiO_2.H_2O$, is heated to about 800° C. the water of constitution is driven off, with the result that the crystal structure becomes less compact, and there is an irreversible linear expansion of 3% to 4%. The characteristic X-ray pattern of pyrophyllite is believed to be preserved to 1000° C., but between 1000° C. and 1100° C. this crystal structure breaks down, giving place to mullite and uncombined silica. This uncombined silica, however, being molecularly dispersed and perhaps poorly crystallized, does not cause the high thermal expansion that would result from the presence of an equal amount of more coarsely-grained pottery flint. We have found that this calcined pyrophyllite has a very low and regular thermal expansion, amounting to between 0.2% and 0.3% at 1000° C.

We have discovered that by using this burned pyrophyllite as grog we are able, because of its low thermal expansion, to bond it with fairly dense burning refractory clays, and still have a final product which has good thermal shock properties. By the use of burned pyrophyllite grog and a small amount of bonding clay we thus create the anomaly—a high silica, refractory body that has good resistance to thermal shock.

Since the porosity of the pyrophyllite particle is rather low and uniformly distributed, we are able, when this particle is bonded with a dense burning clay to produce a structure wherein a large part of the porosity resides in the pyrophyllite particles themselves. As the glass attacks this wall composed of pyrophyllite particles and dense clay matrix, the pyrophyllite, which one might call the disperse phase, is perhaps more soluble than the continuous phase (the dense burning clay matrix), and this makes an ideal structure for contact with glass. In any event, this composition and this structure reduce the formation of stones (undissolved portions of the refractory, usually pieces of grog, in the glass) and cords (volumes of glass, usually molten refractories, having different optical and physical properties because of difference in composition from that of the glass to be melted).

Numerous corrosion tests have shown, furthermore, that pyrophyllite bodies are unusually resistant to attack by molten glass. In laboratory studies of the corrosion resistance of refractories of various compositions, as well as in commercial trials, pyrophyllite bodies have repeatedly shown uniquely and appreciably slower rate of solution than other bodies having the same silica-alumina composition or the same porosity.

We have a further reason for calcining the pyrophyllite before use. We have found that raw pyrophyllite, when crushed, breaks into long, splintery particles. The surface of such particles of raw pyrophyllite is smooth, like soapstone, and has a greasy feel. Both because of the shape of the particles and the nature of their surface, it is difficult to bond crushed raw pyrophyllite with plastic clay. However, after calcining to such a temperature that the typical pyrophyllite crystal structure is broken down, the characteristic cleavage no longer predominates. Therefore, the particles resulting from the crushing of calcined pyrophyllite are more nearly equidimensional and move on one another readily. This fact makes it possible for us to cast pyrophyllite-containing bodies with less water, and under more favorable conditions of flow and of packing, when we use calcined, rather than raw, pyrophyllite. To illustrate, we found that the viscosities of suspensions of 100 grams of 200-mesh crushed pyrophyllite in 66 grams of water (measured with a Stormer viscometer) varied according to the temperature to which the pyrophyllite had previously been fired, as follows:

| Temperature of Calcination | Viscosity of Suspension, Relative to Water |
|---|---|
| °C. | |
| 800 | 190 |
| 1000 | 146 |
| 1200 | 24 |
| 1400 | 22 |

From this we conclude that calcination to a temperature between 1000° C. and 1200° C., or slightly higher, yields the desired shape of particles. In addition, the surface of pyrophyllite calcined to these temperatures is rough, and easily wetted by water. Thus, both because of the improved shape of particle and its improved surface behavior, particles of properly calcined pyrophyllite are more easily wetted and bonded by plastic clay than are particles of raw pyrophyllite.

We have found it desirable, however, to avoid over-firing the pyrophyllite, both during calcination as a grog and in the subsequent manufacture of refractory products. The effect to be avoided is a result of heat-work, and is a function of time and of temperature. When we calcine pyrophyllite in a commercial kiln firing refractories to approximately 1250° C, (pyrometric cone 9) in about 5 days, the thermal expansion is low and regular, but if we calcine the pyrophyllite to about 1400° C. (pyrometric cone 15) in approximately 10 days, we find its expansion to be high in the temperature range in which cristobalite is known to expand rapidly (150-200° C.). We believe that this behavior is due to the fact that the silica set free during the breakdown of the pyrophyllite crystal lattice and remaining after the formation of mullite, referred to above, is recrystallized to cristobalite at the higher temperature in sufficient quantities to have a predominating and deleterious effect on the thermal expansion behavior.

The linear thermal expansion, from room temperature to 750° C., of pyrophyllite calcined at 1250° C. amounted to 0.2%, while that of a similar sample calcined to 1410° C. was 0.8%. When pyrophyllite so calcined was crushed to grog, and incorporated in a refractory body, the resistance to heat shock was poorest in those instances in which the grog had initially been fired to the higher temperature or when a body containing a low-fired grog had been fired subsequently to a higher temperature. Therefore, in the manufacture of ware to have a high resistance to thermal shock, we must take care not to heat either the pyrophyllite grog alone, or a body containing this grog, to a temperature high enough and/or for a time long enough, to develop enough cristobalite to destroy the low thermal expansion. In the manufacture of refractories to be held for a long time at an elevated temperature, rather than being repeatedly heated and cooled to room temperature, we need keep the thermal expansion low only until the refractory is first heated in use. For example, after a glass pot containing properly calcined pyrophyllite has been heated safely and rapidly to the temperature of use, the subsequent formation of large amounts of cristobalite does not affect the quality or service of the refractory.

Much of the pyrophyllite rock on the market has a very low content of iron and titanium, and this fact makes the material of particular value for use in refractories contacting glass. The glass, thereby, does not become contaminated with impurities which would tend to discolor it. Feldspar and other fluxing agents, such as materials high in alkalies, or talc, or the more easily fusible clays, should not be incorporated in pyrophyllite bodies of this type, because they tend to lower the refractoriness to the extent that the material will not be satisfactory for use in contact with molten glass.

It is not necessary to use all of the pyrophyllite content of a body in the calcined or burned condition, but a large amount of raw pyrophyllite cannot be used, for the following reasons: Raw pyrophyllite, when heated, has about 3% linear, irreversible expansion between 550 and 900° C., the most rapid portion of this expansion coming within 650 and 800° C. At these temperatures refractory bonding clays have not acquired much strength and, therefore, raw pyrophyllite bonded by refractory bonding clays produces a very weak structure. The expansion of the pyrophyllite coming at a time just after the clay has lost its combined water finds the bonds between the particles very weak, rupturing many of them. This is shown by the fact that the surface of a bar made from such a mixture contains many very fine cracks, and a large piece is very likely to have, in addition, large cracks in it. In fact, we have been unable to make certain items weighing thirty-five pounds without having to discard the greater percentage of them when they are made with raw pyrophyllite, while when a sufficient portion of the pyrophyllite content is previously calcined no cracking occurs.

It should be noted that the chief reason for calcining the pyrophyllite is to cause the above-mentioned volume expansion to take place before the refractory body has been shaped and fired. For certain purposes, therefore, it may be sufficient to calcine the pyrophyllite to a minimum temperature, around 800° C., and to use it as hereinafter detailed. However, increased mechanical strength, increased resistance to corrosion, and improved flow properties when suspended in a liquid, as mentioned above, are found for crushed pyrophyllite particles when the pyrophyllite is calcined to a temperature of 1000° C. to 1200° C. or slightly higher. An alternative procedure, however, is to calcine the pyrophyllite to the minimum satisfactory temperature, incorporate it into a refractory shape with or without the use of other materials, and either fire the shape to the preferred temperature range or have it reach such a temperature under service conditions.

The following are the important steps in our procedure, namely:

1. The selection of pyrophyllite rock containing a minimum amount of quartz.

2. The calcination of such rock to 800° C. or higher, to remove the water of crystallization of pyrophyllite and to bring about the 3 per cent linear (9% volume) expansion which would have a deleterious effect if it were to take place in the manufacture of a finished product. If the calcination is carried further to a temperature of about 1000° C., and generally not above 1400° C., the structure of the dehydrated pyrophyllite is broken down, with the result that the rock may be crushed to particles of a different shape (than those produced if the rock be either raw or calcined to a temperature lower than 1000° C.) and may be wetted more easily by water. The particles of pyrophyllite calcined to 1000° C. or higher are, because of improved shape and improved surface properties, superior for use as grog. They give better flow properties to casting slips, and they are more tightly bonded by plastic clay.

3. The use of substantial amounts of calcined, crushed rock as a grog, with smaller amounts of uncalcined (raw) pyrophyllite if desired, bonded with raw clay, in the manufacture of refractories, particularly those for use in contact with glass. The clay portion may be ball clay, kaolin, plastic fire clay, and/or other refractory bond clays.

Such refractories will usually be fired, before use, to a temperature at which the bonding clays develop the strength and structure required by the service to which the refractory is to be put.

A typical refractory body suitable for manufacturing ware by slip casting or by plastic molding might contain 75 per cent of properly calcined pyrophyllite, as shown below:

|  | Parts by weight |
|---|---|
| Ball clay | 17 |
| Kaolin | 8 |
| Crushed calcined pyrophyllite (10 to 100 mesh, 50 parts; finer than 100 mesh 25 parts) | 75 |

Kaolin can be omitted from the mixture, and 20 to 25 parts of ball clays and refractory bonding clays can be used, with good results. It will be understood that water or other liquid in sufficient quantity will be included, to give desired plasticity or fluidity to the mixture.

A body with excellent heat shock resistance, made by the dust-pressing or dry-pressing method, may contain 90 per cent of pyrophyllite, of which part may be raw and part calcined:

|  | Parts by weight |
|---|---|
| Ball clay | 10 |
| Raw pyrophyllite, 10 to 100 mesh | 31.5 |
| Calcined pyrophyllite, 10 to 100 mesh | 31.5 |
| Raw pyrophyllite, finer than 100 mesh | 13.5 |
| Calcined pyrophyllite, finer than 100 mesh | 13.5 |

In certain instances, it is possible to dispense with clay entirely and to use small amounts of various waxes, starches, and other binders commonly used in the forming of non-clay bodies. The foregoing are in the class of temporary bonds since they are used only to temporarily maintain the shape of the body and thereafter burn out in firing. Such a body, suitable for forming refractory shapes by pressing, may consist of:

|  | Parts by weight |
|---|---|
| Calcined pyrophyllite, 10 mesh and finer | 50 |
| Calcined pyrophyllite, 80% finer than 325 mesh | 45 |
| Calcined pyrophyllite, 98% finer than 325 mesh | 5 |
| Dextrine | 4 |

Another body of this type might be:

|  | Parts by weight |
|---|---|
| Calcined pyrophyllite, as immediately above | 100 |
| Petroleum paraffin wax emulsified in water | 5 |
| Goulac | 2 |

Another material which can be used in lieu of bonding clay is colloidal silica, which is refractory in that it does not appreciably lower the refractoriness of the body in which it serves as a binder, as distinguished from fluxing materials such as feldspar. An example of its use is given below. The dry materials are mixed together thoroughly, after which a suspension of colloidal silica in water is added and the ingredients are blended further. Depending on the water content, refractory shapes are formed by pressing, or by filling a suitable mold with the mixture and consolidating the same by vibration. A typical body:

|  | Parts by weight |
|---|---|
| Calcined pyrophyllite 10 to 20 mesh | 65 |
| Calcined pyrophyllite 80% through 325 mesh | 35 |
| Colloidal silica (dry basis) | 2 |

We have cited mixes containing relatively large amounts of pyrophyllite, but do not wish to exclude the use of smaller amounts. The advantages of using pyrophyllite disappear only gradually as the amount employed is reduced. Theoretically, at least, any quantity of properly calcined pyrophyllite might be used to better advantage in certain types of ceramic body than would an equal amount of some other non-plastic ingredient commonly used in these bodies. In practice, however, a larger quantity would have to be added before the untrained observer would notice the improvement. So much depends on the method of body preparation, the method of manufacture, the temperature of firing, the use to which the ware is to be put, and the service expected of it, that minimum figures for the amount of pyrophyllite to be used cannot be stated as a generality. Likewise, a few per cent of raw pyrophyllite may, under proper conditions, be enough to improve appreciably the quality and appearance of ware, particularly if the expansion of the pyrophyllite during firing will compensate for the firing shrinkage of other ingredients sufficiently to prevent cracking and similar defects. In instances in which the grog content of a body is not composed entirely of pyrophyllite, but only sufficient is used to keep the general behavior in service within the requirements of the specific product to be manufactured, the balance of the grog may be composed of those refractory materials more commonly used for this purpose, such as raw or calcined flint clay, calcined fireclay, crushed refractory brick, etc.

It will be understood that we may employ mixtures that contain as little as 5 per cent raw pyrophyllite, or as much as 100 per cent calcined pyrophyllite, or any combination between these percentages, depending upon the requirements of the product to be made. In practice, however, the content of crushed raw pyrophyllite generally will not exceed 45 per cent, the amount of crushed calcined pyrophyllite not be less than 10 per cent, and the quantity of refractory bond clay not exceed 50 per cent.

This procedure gives us the advantages of several desirable properties in one product. In the arts of manufacturing refractories, it has been known previously how to attain these properties independently, usually exclusively, but it is extremely difficult to develop these advantages simultaneously, as we are able to do in the manner shown. We obtain:

1. A refractory containing a larger percentage of silica.
2. A refractory with slow and uniform solution by glass, the rate of solution being slow both because of the chemical composition of the refractory and the relatively dense structure to which it may be fired, and uniform because of the uniform structure and texture of the refractory.
3. A refractory in which a high quality of glass may be produced. Because of the chemical composition (high silica content and low iron content) of the grog and the matrix, and because of the structure of the refractory, cords and stones are less frequent than when glass is melted in similar refractories made according to a different procedure.
4. An unfired refractory capable of being fired rapidly, with safety.
5. A fired refractory with very good resistance to thermal shock.

While we have referred to the calcining of the pyrophyllite before crushing, we may, in the practice of our method, crush the pyrophyllite and then calcine it, particularly in the case of the massive type of pyrophyllite which does not break into such long, splintery particles as do the lamellar varieties. However, where the refractory is to be shaped otherwise than by casting, splintery particles may not be objectionable when calcined.

In the accompanying claims, the term "refractory" contemplates bodies, suitable for use in contact with molten glass and other metals, ordinarily having a pyrometric cone equivalent of cone 26 or higher, which will withstand the temperatures at which glass and other metals become molten.

We claim as our invention:

1. A refractory mixture consisting of (by weight)

Refractory bonding clay _____ 25%, of which kaolin is 8%
Crushed pyrophyllite calcined within the range of 1000° C. to 1400° C. _____ 75%

2. A refractory mixture consisting of (by weight)

Per cent
Refractory bonding clay _____ 10-25
Crushed pyrophyllite calcined at a temperature within the range 1000° C. to 1400° C. _____ 75-90

3. A refractory mixture consisting of (by weight)

Per cent
Refractory bonding clay _____ 5-50
Crushed pyrophyllite calcined within the temperature range 1000° C. to 1400° C. _____ 50-95

EDWARD C. HENRY.
JOHN L. LEECH.
LELAND R. ARMSTRONG.

REFERENCES CITED

The following references are of record in the file of this patent:

UNITED STATES PATENTS

| Number | Name | Date |
|---|---|---|
| 1,768,545 | Curtis | July 1, 1930 |
| 1,984,163 | Sproat | Dec. 11, 1934 |
| 2,073,136 | Bennett | Mar. 9, 1937 |
| 2,159,349 | Bennett | May 23, 1939 |
| 2,257,380 | Hepner | Sept. 30, 1941 |